(12) United States Patent
Mazumdar

(10) Patent No.: US 8,803,468 B2
(45) Date of Patent: Aug. 12, 2014

(54) SYSTEM AND METHOD FOR FAST DISCHARGE OF A RING MOTOR FIELD

(75) Inventor: Joy Mazumdar, Norcross, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 643 days.

(21) Appl. No.: 12/897,163

(22) Filed: Oct. 4, 2010

(65) Prior Publication Data

US 2012/0081818 A1 Apr. 5, 2012

(51) Int. Cl.
*H02P 27/00* (2006.01)
*H02H 7/08* (2006.01)

(52) U.S. Cl.
USPC .............................................. 318/717; 361/23

(58) Field of Classification Search
USPC .............................................. 318/717; 361/23
See application file for complete search history.

(56) References Cited

U.S. PATENT DOCUMENTS

| | | | | |
|---|---|---|---|---|
| 3,656,137 | A * | 4/1972 | Ratz | 340/676 |
| 7,005,815 | B2 * | 2/2006 | Takeuchi et al. | 318/265 |
| 2002/0074803 | A1 | 6/2002 | Kajiura | |
| 2003/0094524 | A1* | 5/2003 | Scuccato | 241/299 |
| 2005/0012480 | A1* | 1/2005 | Takeuchi et al. | 318/265 |
| 2005/0279870 | A1* | 12/2005 | Scuccato | 241/101.2 |
| 2008/0164852 | A1 | 7/2008 | Taniguchi | |
| 2010/0079117 | A1* | 4/2010 | Bekiarov | 322/28 |
| 2012/0019216 | A1* | 1/2012 | Lewis et al. | 320/166 |

FOREIGN PATENT DOCUMENTS

| | | | |
|---|---|---|---|
| JP | 2007334565 | A | 12/2007 |
| JP | 2008182879 | A * | 8/2008 |

OTHER PUBLICATIONS

U.S. Appl. No. 12/604,580, Joy Mazumdar and Walter Kollner, "Peak Demand Reduction in Mining Haul Trucks Utilizing an On-Board Energy Storage System", filed Oct. 23, 2009.
U.S. Appl. No. 12/466,722, Joy Mazumdar, Walter Kollner, Andreas Holweck, Michael G. Onsager, and Ekkehard Pittius, "Limiting Peak Electrical Power Drawn by Mining Excavators", filed May 15, 2009.
U.S. Appl. No. 12/604,571, Joy Mazumdar and Walter Kollner, "System and Method for Reinjection of Retard Energy in a Trolley-Based Electric Haul Truck", filed Oct. 23, 2009.
PCT International Search Report mailed Mar. 12, 2013 corresponding to PCT International Application No. PCT/US2011/051731 filed Sep. 15, 2011 (8 pages).
European Communication mailed Feb. 13, 2014 corresponding to European Application No. 11767848.2 filed Sep. 15, 2011 (8 pages).

* cited by examiner

*Primary Examiner* — Eduardo Colon Santana
*Assistant Examiner* — Gabriel Agared

(57) ABSTRACT

High-power synchronous motors are commonly used in mining operations, for example, in gearless draglines, gearless conveyor drives, and gearless mill drives. Substantial electromagnetic energy is stored in the inductive field windings. In the event of a system fault, such as a short in the direct current power source exciting the field windings, the electromagnetic energy needs to be discharged from the field windings. This electromagnetic energy is typically dissipated as waste heat through a resistor. Disclosed is a field discharge system in which the electromagnetic energy is captured and stored as electrical energy in a capacitor. If an ultracapacitor bank is used for storage, the charged ultracapacitor bank can be used as a backup or auxiliary power source for mining operations. The discharge time is sufficiently small that high speed circuit breakers are not needed to disconnect stator windings from the alternating current power source when a fault occurs.

16 Claims, 7 Drawing Sheets

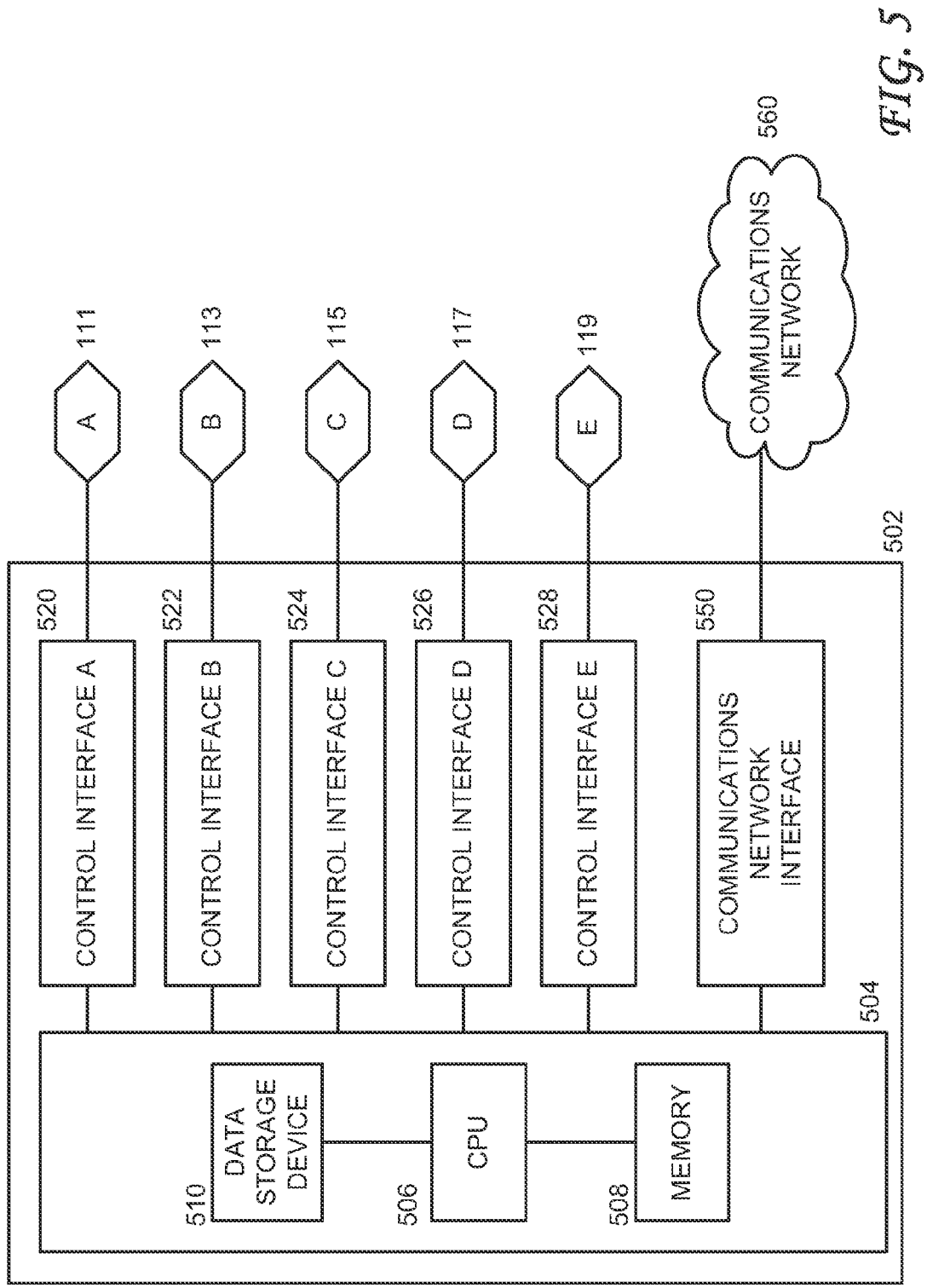

US 8,803,468 B2

SYSTEM AND METHOD FOR FAST DISCHARGE OF A RING MOTOR FIELD

BACKGROUND OF THE INVENTION

The present invention relates generally to motors, and more particularly to fast discharge of a ring motor field.

High-power synchronous alternating current (AC) motors are used in a number of industrial applications. In mining, for example, high-power synchronous AC motors are used for gearless draglines (with a capacity of ~10,000 horsepower), gearless conveyor drives, and gearless mill drives. High-power synchronous AC motors are also deployed in other systems, such as wind turbines.

A salient pole AC synchronous motor includes a set of polyphase distributed windings called the stator and a rotor with a field winding. The stator windings are fed with AC. Field circuits or excitation systems for the field winding can be energized using a DC source. The DC source can be obtained, for example, from a three-phase AC power supply using an active front end (AFE) rectifier that charges a DC link and then using a DC chopper to get the necessary field excitation. The same DC link can also be used to feed an inverter circuit that provides the AC source for the stator windings. The DC link, the inverter, and the input to the stator are prone to faults.

Large drive currents are used in operation. Since the field winding of a high-power AC synchronous motor is inductive, substantial electromagnetic energy is stored in the field winding. In the event of a DC link short circuit fault or a stator side short circuit fault, the field circuit needs to be de-energized, and the stator circuit needs to be isolated from the AC source. Typically, field de-energization is achieved through a field crowbar circuit. The discharge time is long, and high speed circuit breakers are needed to disconnect the stator windings from the AC source. The field energy is dissipated as waste heat.

BRIEF SUMMARY OF THE INVENTION

In an alternating current (AC) synchronous motor, the field winding is energized by a direct current (DC) power source. Substantial electromagnetic energy is stored in the inductive field winding. In the event of a system fault, such as a short circuit in the DC power source, the electromagnetic energy needs to be discharged from the field winding. The electromagnetic energy is captured and stored as electrical energy in a capacitor. In an embodiment, an ultracapacitor bank is used for storage, and the charged ultracapacitor bank is used as a backup or auxiliary power source. The backup or auxiliary power source can be used to supply power for mining operations.

In an embodiment, a field discharge system includes a first switch, a second switch, and a storage capacitor. During normal operation, the first switch is opened, and the second switch is closed. A circuit is completed between a DC power source, the field winding, and the closed second switch. During a fault condition, the DC power to the field winding is removed, the second switch is opened, the first switch is closed, and the electromagnetic energy stored in the field winding is transferred to the storage capacitor.

These and other advantages of the invention will be apparent to those of ordinary skill in the art by reference to the following detailed description and the accompanying drawings.

BRIEF DESCRIPTION OF THE DRAWINGS

FIG. 5 shows a schematic of a computational system implementing a field discharge system controller.

DETAILED DESCRIPTION

Figure 1:
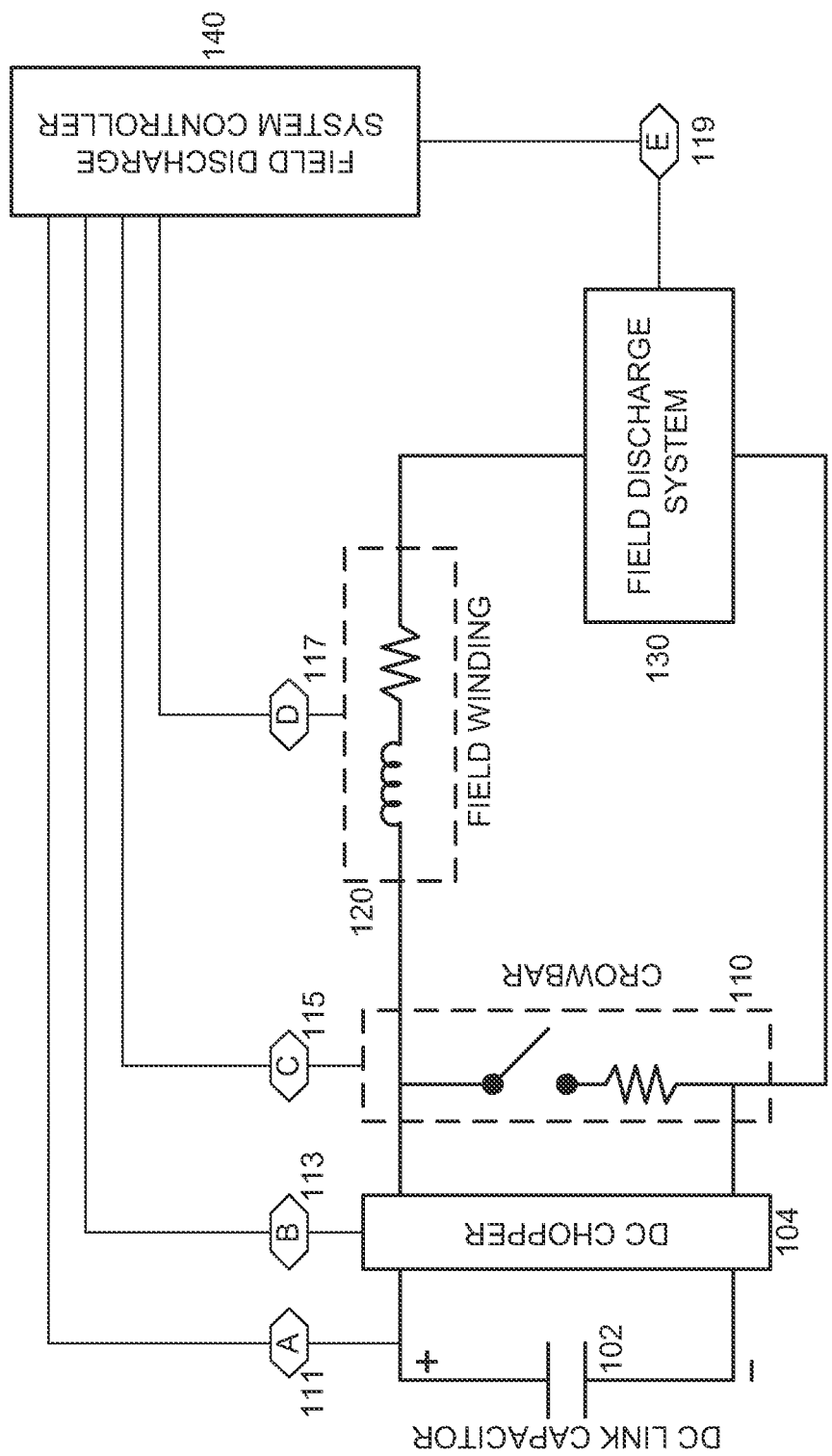
FIG. 1 shows a schematic of a field excitation power system incorporating a field discharge system.

A salient pole AC synchronous motor includes a set of polyphase distributed windings called the stator and a rotor with a field winding. The stator windings are fed with AC. Field circuits or excitation systems for the field winding can be energized using a DC source. The DC source can be obtained, for example, from a three-phase AC power supply using an active front end (AFE) rectifier that charges a DC link and then using a DC chopper to get the necessary field excitation. The same DC link can also be used to feed an inverter circuit that provides the AC source for the stator windings. The DC link, the inverter, and the input to the stator are prone to faults.

For high-power applications, such as mobile mining, the machine ratings can be in the megawatt range, and the currents can range in the hundreds of amps. Since a field winding is inductive, the high currents result in substantial electromagnetic energy stored in the inductive field. In the event of a short circuit in the DC link or stator side circuit, the stator windings will feed the fault when energy in the field winding is present. Short circuit torque of the motor will also be generated. Since the short circuit torque is typically five to six times the rated torque of the motor, the motor can be damaged.

Since conventional methods, described below, discharge the field energy slowly, expensive high speed circuit breakers (HSCBs) are used to rapidly disconnect the stator windings from the AC source when a fault occurs. For a multiple stator winding synchronous motor with nine windings, for example, twenty-seven HSCBs would be needed.

In the event of a fault, such as a short in the DC link, an important action would be to dissipate the field energy as soon as possible in order to maintain safe operation. Rapid dissipation avoids subjecting the machine system to overvoltage conditions and high torque pulsations and prevents the energy stored in the field winding from feeding the fault. This energy is difficult to dissipate quickly through a small resistance. The time constant for discharge is given by L/R, where is L is the inductance and R is the resistance of the field winding; therefore, as the resistance decreases, the time constant increases. Typical time constants are in the range of five seconds. Converting large quantities of field energy into waste heat, furthermore, can cause excessive heating of the machine system; therefore, increased cooling, with attendant costs, is required.

Conventional techniques for discharging the field current utilize shorting the field winding through a discharge resistance and then opening circuit breakers. Since the field is highly inductive in nature, the field current cannot be interrupted instantly using the circuit breakers. The resultant voltage surge across the circuit breaker can be high enough to destroy the circuit breaker. Therefore, the circuit breaker is operated a couple of seconds after a discharge contact closes. The current starts transferring to the branch containing the discharge resistance through the discharge contact, and, concurrently, the circuit breaker is opened. The arcing impedance causes the current to decay, and, at the same time, forces the current to flow through the discharge resistance. Eventually, the current flowing through the circuit breaker is transformed into the plasma state, which is extinguished through a dedicated mechanism, and the remaining current decays through the discharge resistance. In addition to the field discharge circuitry, a DC overvoltage protection circuit known as a crowbar is also connected in parallel with the discharge contact. This circuit takes care of any unwanted surges in the voltage above the rated maximum operating voltage of the field winding.

The field discharge circuit described above requires a DC circuit breaker dedicated for field discharge circuits. To reduce the costs of the system, a conventional circuit breaker is often combined with the static field discharge circuit. Even AC circuit breakers with DC interruption capacity can be used in these systems. If the power is being derived from an AC source, the circuit breakers could be connected on the AC side. All these techniques, however, require the use of circuit breakers, which are expensive components in high-power applications.

In an embodiment of the invention, the electromagnetic field energy in the field winding is transferred to a storage capacitor. The field energy is discharged in a sufficiently short time that high speed circuit breakers are not needed to disconnect the stator windings from the AC source. The field energy is not dissipated as waste heat. The charged capacitor can then be used as a backup or auxiliary power source for various operations, including mining operations.

FIG. 1 shows a schematic of an embodiment of a field power system represented by system elements. The DC source is provided by DC link capacitor 102 and DC chopper 104. In addition to providing overvoltage protection, crowbar 110 can be used to short the field circuit. The field winding 120 is represented as an inductor (with an equivalent inductance L) in series with a resistor (with an equivalent resistance R). The field discharge system 130 is shown in more detail below in FIG. 2A-FIG. 2C.

The system elements also include control elements for monitoring the operation of and controlling the operation of the system elements. Herein, a particular control element is associated with, or corresponds to, a particular system element. Control elements are well known in the art and are not discussed in detail here. Examples of control elements include the following. DC link capacitor 102 has a control element A 111 that measures the voltage across the capacitor. DC chopper 104 has a control element B 113 that controls and monitors the operation of the DC chopper. Crowbar 110 has a control element C 115 that opens and closes the crowbar. Field winding 120 has a control element 117 that measures the field current flowing through the field winding and the field voltage across the field winding. Field discharge system 130 has a control element E 119 that controls operation of the field discharge system.

The control elements communicate with field discharge system controller 140, which is discussed in further detail below. In an embodiment, the field discharge system controller 140 communicates with the control elements via various control signals. The field discharge controller 140 can communicate with the control elements via various communications modes, including individual circuits, a common data-bus, and a data network.

Herein, control signals include analog signals, digital signals, messages, and commands. Herein, control signals include control signals that control a system element, control signals that report the state of a system element, and control signals that report the values of parameters from a system element. An example of a control signal that controls a system element is a control signal that turns a switch on/off. An example of a control signal that reports the state of a system element is a control signal that reports a short in the DC link. An example of a control signal that reports values of parameters is a control signal that reports the current flowing through a field winding and the voltage across the field winding.

Figure 2A:
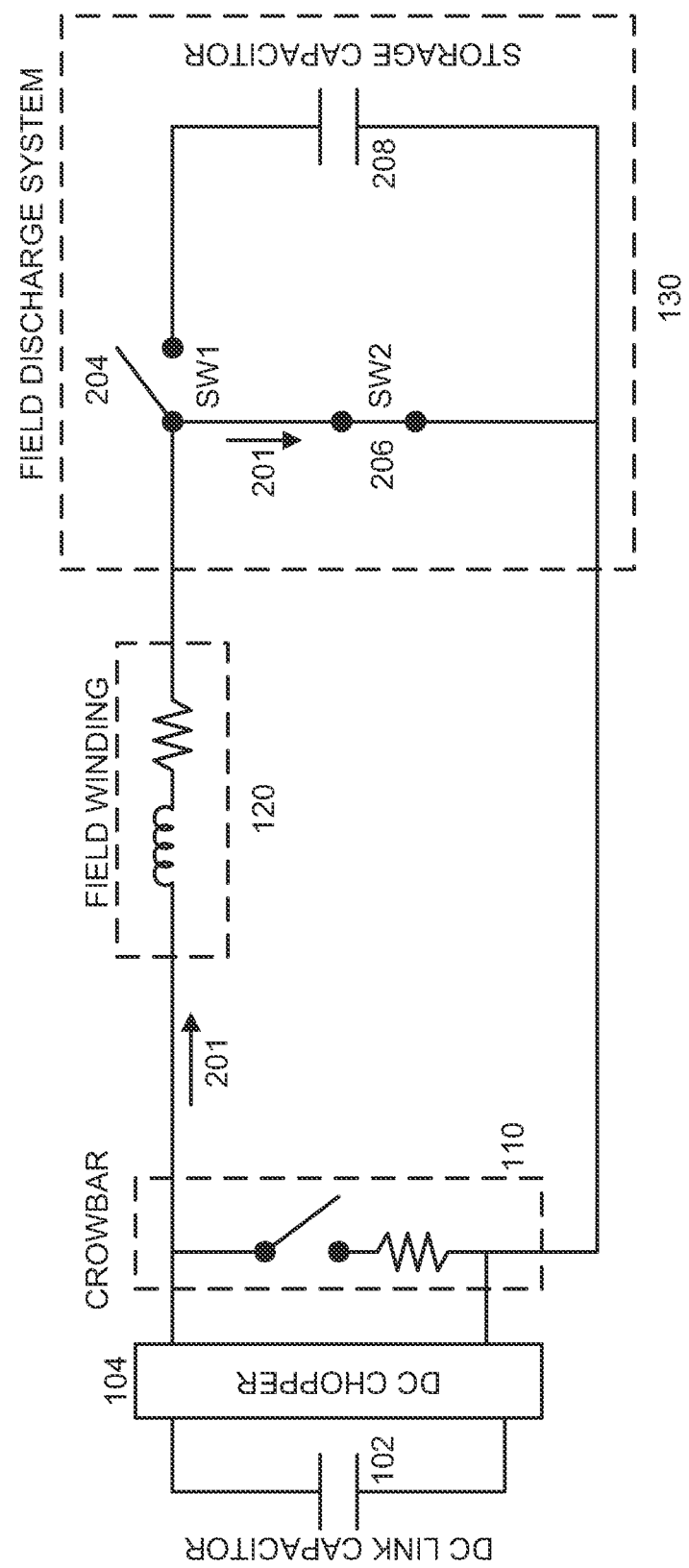
FIG. 2A-FIG. 2C show schematics of the field discharge system under various modes of operation.
Figure 2B:
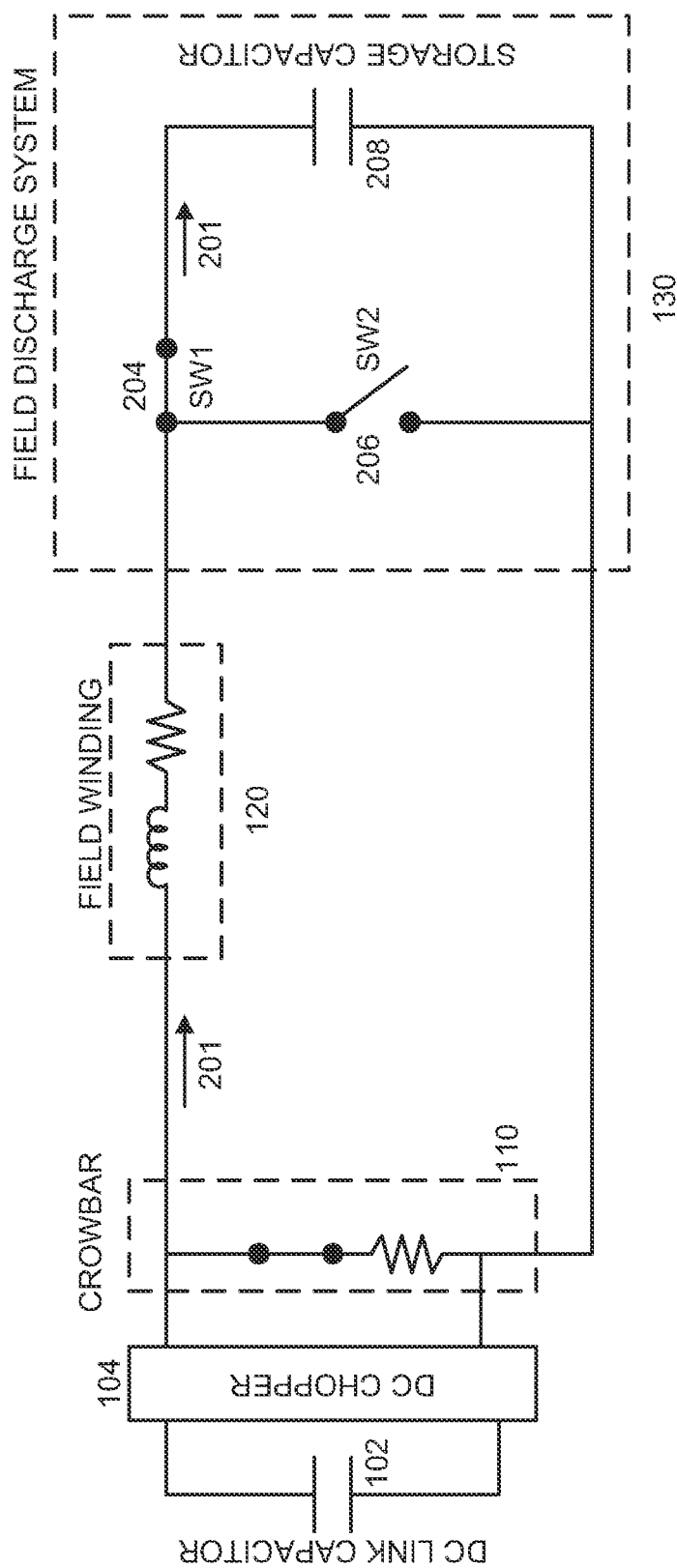
Figure 2C:
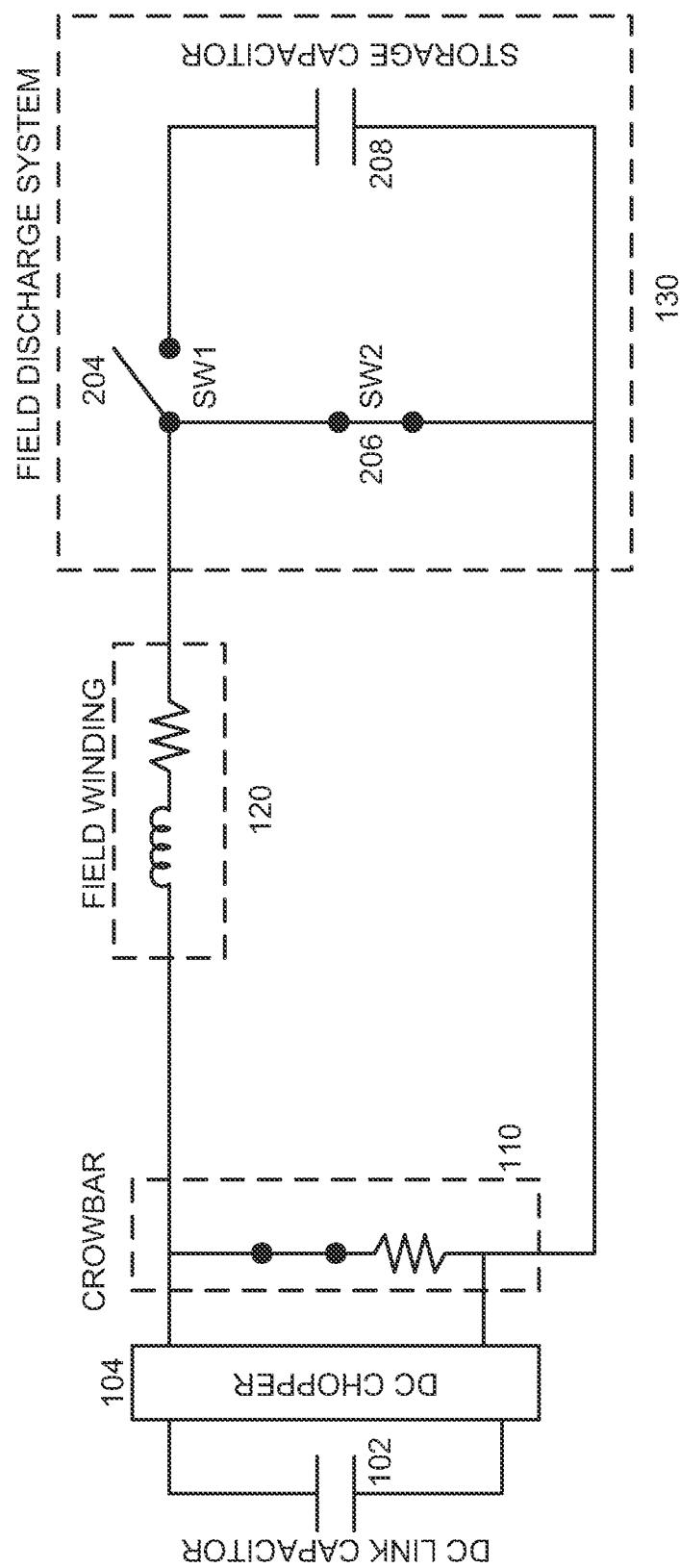

FIG. 2A-FIG. 2C show details of the field discharge system 130 under different modes of operation. To simplify the figures, the control elements and the field discharge system controller are not shown. The field discharge system 130 includes switch SW1 204, switch SW2 206, and storage capacitor 208 (with capacitance C). In an embodiment, switch SW1 204 is implemented with a diode, and switch SW2 206 is implemented with an insulated gate bipolar transistor (IGBT). One skilled in the art can implement the switches with other electrical and electronic components.

In FIG. 2A, the field power system is operating under normal conditions. A constant field current 201 flows through field winding 120 and through switch SW2 206, which is closed. During this time, switch SW1 204 is open. In one embodiment, storage capacitor 208 has an initial charge, which can, for example, be supplied from DC link capacitor 102 (using appropriate circuitry, not shown). That is, the DC link capacitor 102 can be used to partially charge storage capacitor 208. In another embodiment, storage capacitor 208 has no initial charge.

In FIG. 2B, a fault occurs. For example, a short occurs on the DC link. Crowbar 110 is closed; switch SW2 206 is opened; and switch SW1 204 is closed. These actions are performed under the control of the field discharge system controller 140 (see FIG. 1). As a result of these switching operations, a resonant LCR circuit is formed. The electromagnetic field energy of the inductor in field winding 120 is then transferred as electrical energy to the storage capacitor 208. Due to the transfer of energy from the inductor to the storage capacitor 208, the field current 201 goes down to zero as the capacitor voltage increases.

In FIG. 2C, as soon as the current 201 drops to zero, switch SW1 204 is opened, and switch SW2 206 is closed. All the energy of the inductor has now been transferred to the storage capacitor 208. In an embodiment, this stored energy is used as a power source for various operations instead of being dissipated as waste heat. Storage capacitor 208, for example, can be used as a backup or auxiliary power source in a mining operation. Circuitry for drawing power from storage capacitor 208 is not shown.

The resonant equations for the LCR circuit are expressed in (E1) and (E2) below.

$$i_L(t) = I_{L0}\cos(\omega_r t) + \left(\frac{V_s - V_{C0}}{Z_r}\right)\sin(\omega_r t) \quad \text{(E1)}$$

$$v_c(t) = V_s - (V_s - V_{c0})\cos(\omega_r t) + Z_r I_{L0}\sin(\omega_r t), \quad \text{(E2)}$$

where:
$i_L(t)$=inductor current as a function of time t
$v_c(t)$=capacitor voltage as a function of time t
$I_{L0}$=initial inductor current
$V_s$=field supply voltage
$V_{C0}$=initial capacitor voltage
$\omega_r$=resonance frequency
$Z_r$=complex impedance at the resonance frequency.
In FIG. 2B and FIG. 2C, the field supply voltage $V_s$ is zero, because the DC link capacitor 102 has short circuited (assumed fault condition). Therefore, the equations for $i_L$ and $V_c$ reduce to $$i_L(t) = I_{L0}\cos(\omega_r t) + \left(\frac{-V_{C0}}{Z_r}\right)\sin(\omega_r t) \quad \text{(E3)}$$

$$v_c(t) = V_{c0}\cos(\omega_r t) + Z_r I_{L0}\sin(\omega_r t). \quad \text{(E4)}$$

As can be seen from (E4), if $V_{C0}$ is set to 0 (that is, storage capacitor 208 is initially uncharged), then the current is cosine in nature. This functional dependence ensures that the current trajectory goes down immediately, leading to a desired steep drop in the current magnitude. A steep drop in the current magnitude, however, can lead to a sudden rise in capacitor voltage, depending on the chosen value of the capacitance. Therefore, an advantageous design point has to be obtained, depending on the constraints of the circuit. This can be achieved by transforming the problem into a linear program to determine an advantageous design for the circuit elements, depending on the physical constraints of the devices, such as voltage and current rating:

$$\text{maximize } \frac{\partial i_L(t)}{\partial t} \text{ such that}$$

$$v_c(t) = V_{c0}\cos(\omega_r t) + Z_r I_{L0}\sin(\omega_r t) \leq V_c^{max} \ \forall \ t \geq t_f, \quad \text{(E5)}$$

where $t_f$ is the fault time (time at which a fault occurs), and $V_C^{max}$ is the rated maximum operating voltage (design specification) of the capacitor.

Assume that the inductor current is allowed to discharge to a non-zero value, and then switch SW2 206 is closed; it then follows that:

$$t_d = \frac{1}{\omega_r}\left[\phi - \sin^{-1}\left(\frac{Z_r I_{Ld}}{\Psi}\right)\right] \quad \text{(E6)}$$

$$\Psi = \sqrt{(Z_r^2 I_{L0}^2 + V_{c0}^2)} \quad \text{(E7)}$$

$$\phi = \tan^{-1}\left(\frac{Z_r I_{L0}}{V_{c0}}\right) \quad \text{(E8)}$$

$$v_c = \sqrt{([I_{L0}^2 - I_{Ld}^2]Z_r^2 + V_{c0}^2)}, \quad \text{(E9)}$$

where $\phi$=the phase angle between the current and the voltage, and $t_d$=the discharge time to reach the current value $I_{Ld}$. This equation shows that, if $I_{Ld}$ is zero, then the voltage across the capacitor reaches a maximum value, and the discharge time reaches a maximum value as well. If the current can be allowed to have some small non-zero value, and, if this current presents no threats for the equipment, it would then slowly dissipate through the discharge resistance.

The maximum voltage that is generated across the capacitor during operation needs to be limited to $V_C^{max}$. Thus, the upper limit can be fixed, and a value of capacitance can be selected accordingly to obtain a small discharge time.

$$t'_d = \frac{1}{\omega_r}\left[\sin^{-1}\left(\frac{V_c^{max}}{\Psi}\right) - \delta\right], \quad \text{(E10)}$$

where $\delta = \tan^{-1}\left(\frac{V_{c0}}{Z_r I_{L0}}\right)$. Note that $\delta = \frac{\pi}{2} - \phi$.

Ignoring losses, the inductor energy is equal to the capacitor energy:

$$\frac{1}{2}Li^2 = \frac{1}{2}CV^2, \quad \text{(E11)}$$

where i is the current flowing through the inductor, and V is the voltage across the capacitor. In an embodiment, the following values were used for simulation. For i=600 A, L=3.125 H, and V=2000 V, then C=280 mF. The value of capacitance found above would be the minimum needed to meet the energy storage requirements. In an embodiment, ultra-capacitor modules are used. In an embodiment, the capacitance of a module is 63 F, and its voltage rating is 125V. A stack of 14 modules connected in series results in an effective capacitance of 4.2 F at a voltage rating of 1850V. Herein, the term capacitor refers to a single capacitor, a stack of capacitors, or a capacitor bank.

In an embodiment, the field winding from a single motor is coupled to a single capacitor. In another embodiment, the field windings from multiple motors are coupled to a single capacitor; appropriate circuitry is implemented when multiple field windings share a single capacitor.

Figure 3A:
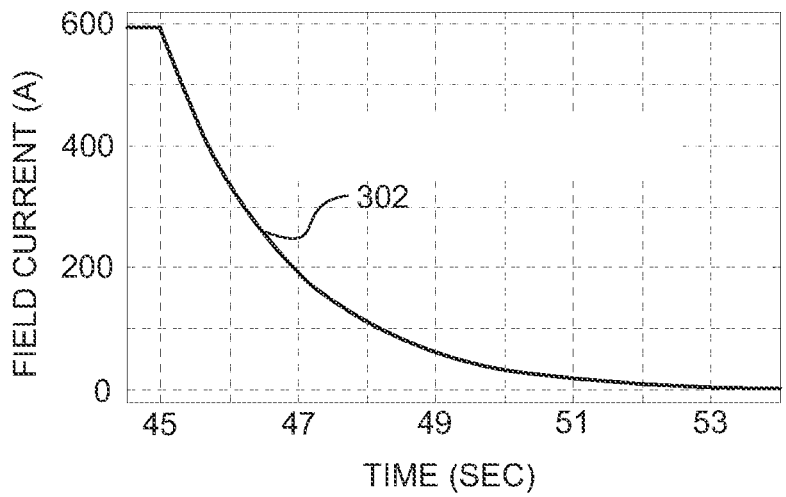
FIG. 3A-FIG. 3C show plots of the decay of field current as a function of time for three different field energy dissipation schemes.
Figure 3B:
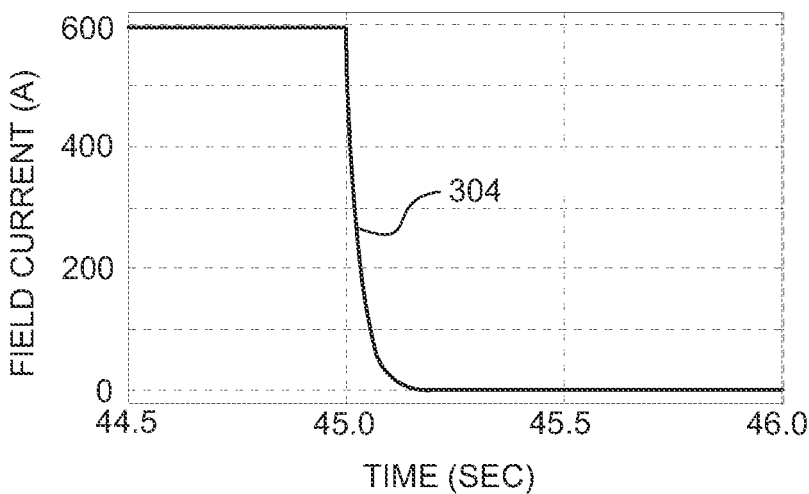
Figure 3C:
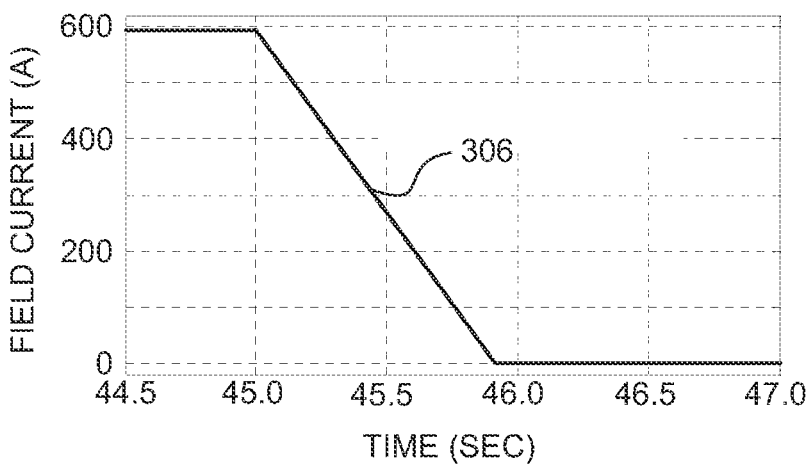

FIG. 3A-FIG. 3C show simulated results for three different field discharge configurations. Shown are plots of field current (A) as a function of time (sec). In FIG. 3A, plot 302 shows the decay of field current as a function of time in which the field circuit is simply shorted out (base case). In FIG. 3B, plot 304 shows the decay of field current as a function of time in which the field circuit is shorted through an external resistance (resistive case). In FIG. 3C, plot 306 shows the decay of field current as a function of time in a field circuit in which the energy is transferred to a capacitive element using a resonant circuit (resonant case). Key parameters are the discharge time and the maximum voltage generated across the capacitor. Simulation studies yield the following results:

Base case (crowbar discharge resistance=1.17 ohm):
discharge time=9 sec, maximum voltage=~700 V Resistive case (external resistance=100 ohm): discharge time=200 ms, maximum voltage=~60 kV Resonant case: discharge time=920 ms, maximum voltage=~1800 V.

Further simulation studies indicate that the discharge time decreases as the capacitance is decreased; however, the maximum voltage generated across the capacitor increases as the capacitance is decreased. There are, therefore, design tradeoffs to be considered.

Figure 4:
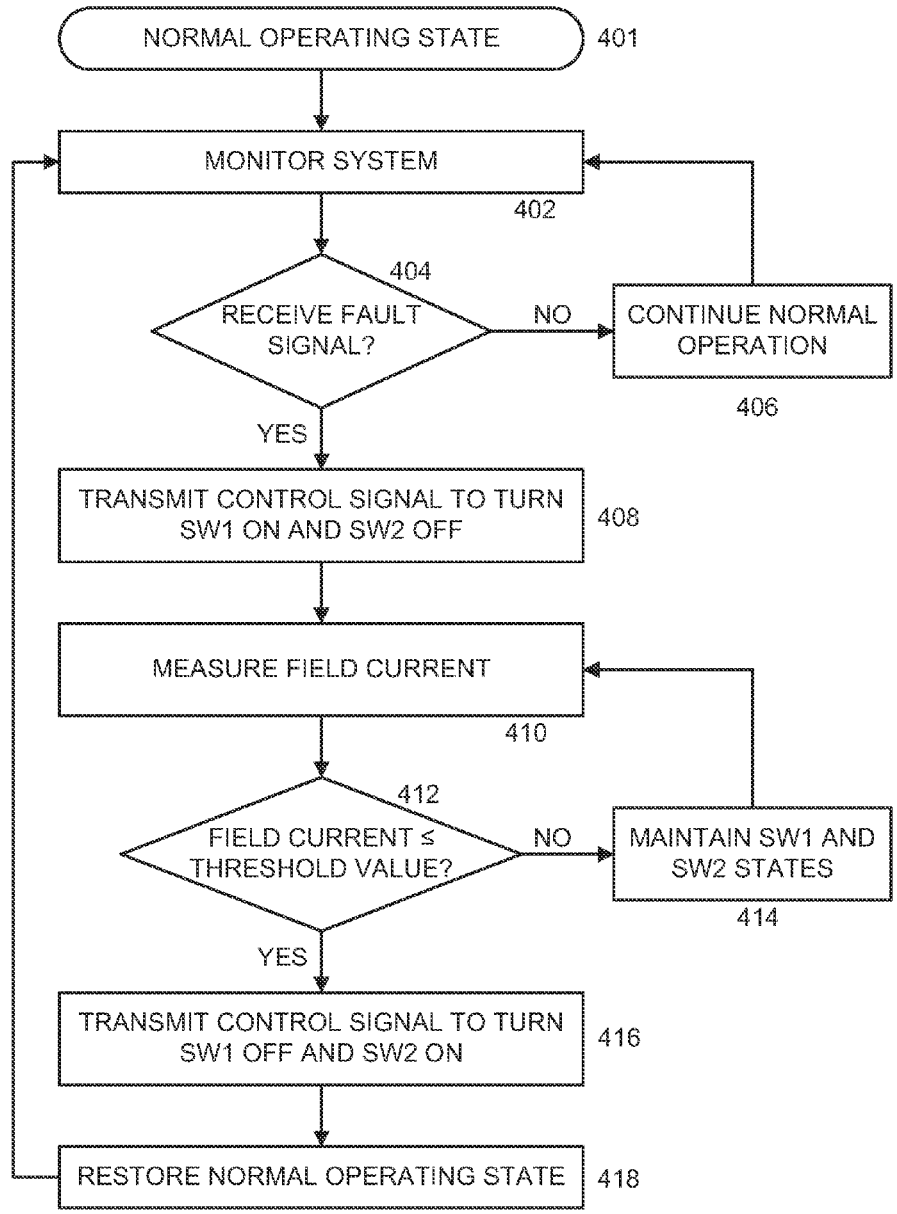
FIG. 4 shows a flowchart of a method for discharging field energy to a storage capacitor.

FIG. 4 shows a flowchart of a method for discharging field energy, according to an embodiment. In an embodiment, the method steps are performed by field discharge controller 140 (see FIG. 1). One embodiment of a field discharge controller is described below with reference to FIG. 5. As described above, field discharge system controller 140 transmits control signals to and receives control signals from control element A 111—control element E 119 in the field power system. In another embodiment, field discharge system controller 140 transmits control signals to and receives control signals from control elements in the overall operations system (such as a mining operation). For example, it can receive overtemperature alarms from the motor and user-issued commands (issued by a control or operations engineer, for example) associated with shutting down a motor.

The process starts with the system in its normal operating state 401. In step 402, the system is monitored. The process then passes to step 404. When a fault occurs in a system element, the associated control element transmits a fault signal to field discharge system controller 140. Herein, control signals include fault signals. Fault signals include analog signals, digital signals, messages, and commands. One example of a fault is a short circuit of the DC bus capacitors in the DC link. Another example of a fault is a short circuit in the IGBT modules in the inverter circuit that feeds the stator windings. If a fault signal is not received, then the process passes to step 406, normal system operation continues, the process returns to step 402, and system monitoring continues. If a fault signal is received, then the process passes to step 408.

In step 408, a control signal is transmitted to field discharge system 130 (see FIG. 1). Switch SW1 204 is turned on (closed), and switch SW2 206 is turned off (opened) to allow the transfer of energy from the field winding 120 to the storage capacitor 208. The process then passes to step 410 in which the field current through the field winding is measured. As discussed above, the field energy is discharged until the field current reaches a safe operating level (which is dependent on circuit components and circuit design). In some embodiments, the field energy is discharged until the field current is zero. In general, the field energy is discharged until the field current is less than or equal to a predetermined threshold value. The threshold value can be zero.

The process then passes to step 412. If the field current is not less than or equal to the threshold value, then the process passes to step 414, in which the states of switch SW1 204 and switch SW2 206 are maintained to allow the continuing transfer of energy from the field winding 120 to the storage capacitor 208. The process returns to step 410, and measurement of the field current continues. In step 412, if the field energy has discharged sufficiently such that the field current is less than or equal to the threshold value, then the process passes to step 416, in which a control signal is transmitted to field discharge system 130. Switch SW1 204 is turned off (opened), and switch SW2 206 is turned on (closed). The process then passes to step 418 in which the fault is corrected and the normal operating state is restored. The process then returns to step 402, and system monitoring continues.

In the embodiment shown in FIG. 4, the transfer of electromagnetic energy from the field winding to the storage capacitor is triggered by a fault in a system element. In another embodiment, the transfer of electromagnetic energy from the field winding to the storage capacitor is triggered by other control signals, including user-issued commands. In general, the electromagnetic energy from the field winding can be transferred to the storage capacitor whenever the field winding is de-energized, even in the absence of a fault condition. For example, during normal shutdown of a motor, the electromagnetic energy from the field winding can be transferred to the storage capacitor to recapture the energy for future use, rather than dissipating the field energy as waste heat.

FIG. 5 shows a schematic of an embodiment of a computational system 502 for implementing a field discharge system controller 140 (see FIG. 1). One skilled in the art can construct the computational system 502 from various combinations of hardware, firmware, and software. One skilled in the art can construct the computational system 502 from various combinations of electronic components, such as general purpose microprocessors, digital signal processors (DSPs), application-specific integrated circuits (ASICs), and field-programmable gate arrays (FPGAs).

Computational system 502 comprises computer 504, which includes a central processing unit (CPU) 506, memory 508, and data storage device 510. Data storage device 510 comprises at least one non-transitory, persistent, tangible computer readable medium, such as non-volatile semiconductor memory, a magnetic hard drive, and a compact disc read only memory.

Computational system 502 can further comprise one or more user input/output interfaces (not shown) that interfaces computer 504 with one or more user input/output devices (not shown). Examples of a user input/output device include a keyboard, a mouse, and a local access terminal. Data, including computer executable code, can be transferred to and from computer 504 via the user input/output interfaces. Computational system 502 can further comprise a video display interface (not shown), which drives a video display (not shown).

Computational system 502 can further comprise one or more control interfaces through which computer 504 can send and receive data or signals. In an embodiment, control interface A 520—control interface E 528 communicate with control element A 111—control element E 119, respectively (see FIG. 1).

Computational system 502 can further comprise one or more communications network interfaces that interface computer 504 with communications networks, such as local area networks and wide area networks. Data, including computer executable code, can be transferred to and from computer 504 via communications network interfaces. For example, computational system 502 can be remotely accessed via communications network interface 550 and communications network 560. In an embodiment, data is sent to and received from control element A 111—control element E 119 (see FIG. 1) via communications network interface 550 and communications network 560.

As is well known, a computer operates under control of computer software, which defines the overall operation of the computer and applications. CPU 506 controls the overall operation of the computer and applications by executing computer program instructions that define the overall operation and applications. The computer program instructions can be stored in data storage device 510 and loaded into memory 508 when execution of the program instructions is desired. The method steps shown in the flowchart in FIG. 4 can be defined by computer program instructions stored in memory 508 or in data storage device 510 (or in a combination of memory 508 and data storage device 510) and controlled by the CPU 506 executing the computer program instructions. For example, the computer program instructions can be implemented as computer executable code programmed by one skilled in the art to perform algorithms implementing the method steps shown in the flowchart in FIG. 4. Accordingly, by executing the computer program instructions, the CPU 506 executes algorithms implementing the method steps shown in the flowchart in FIG. 4.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for discharging electromagnetic energy from a field winding of a synchronous motor, wherein the field winding is energized by a direct current source comprising a direct current link capacitor, the method comprising the steps of:
  receiving a fault signal indicating that a short circuit of the direct current link capacitor has occurred;
  in response to the fault signal, transferring, by one or more switches of a field discharge system, the electromagnetic energy from the field winding to an ultracapacitor;
  storing the electromagnetic energy in the ultracapacitor;
  measuring a field current flowing through the field winding; and
  stopping transfer of the electromagnetic energy to the ultracapacitor when the field current is less than or equal to a threshold value.

2. The method of claim 1, further comprising the steps of:
  receiving a command; and
  in response to the command, transferring the electromagnetic energy to the ultracapacitor.

3. The method of claim 1, wherein the synchronous motor drives one of a gearless dragline, a gearless conveyor, or a gearless mill.

4. The method of claim 1, further comprising the step of:
  partially charging the ultracapacitor prior to transferring the electromagnetic energy to the ultracapacitor.

5. The method of claim 1, further comprising the step of:
  discharging electrical energy from the ultracapacitor after the electromagnetic energy has been stored in the ultracapacitor.

6. An apparatus for discharging electromagnetic energy from a field winding of a synchronous motor, wherein the field winding is energized by a direct current source comprising a direct current link capacitor, the apparatus comprising:
  means for receiving a fault signal indicating that a short circuit of the direct current link capacitor has occurred;
  means for controlling one or more switches of a field discharge system to transfer the electromagnetic energy from the field winding to an ultracapacitor in response to the fault signal;
  means for storing the electromagnetic energy in the ultracapacitor;
  means for measuring a field current flowing through the field winding; and
  means for stopping transfer of the electromagnetic energy to the ultracapacitor when the field current is less than or equal to a threshold value.

7. The apparatus of claim 6, further comprising:
  means for receiving a command; and
  means for transferring the electromagnetic energy to the ultracapacitor in response to the command.

8. The apparatus of claim 6, further comprising: means for partially charging the capacitor prior to transferring the electromagnetic energy to the ultracapacitor.

9. The apparatus of claim 6, further comprising: means for discharging electrical energy from the ultracapacitor after the electromagnetic energy has been stored in the ultracapacitor.

10. A non-transitory computer readable medium storing computer program instructions for discharging electromagnetic energy from a field winding of a synchronous motor, wherein the field winding is energized by a direct current source comprising a direct current link capacitor, the computer program instructions defining the steps of:
  receiving a fault signal indicating that a short circuit of the direct current link capacitor has occurred;
  in response to the fault signal, transferring, by one or more switches of a field discharge system, the electromagnetic energy from the field winding to an ultracapacitor;
  storing the electromagnetic energy in the ultracapacitor;
  wherein the computer program instructions further comprise computer program instructions defining the steps of:
  measuring a field current flowing through the field winding; and
  stopping transfer of the electromagnetic energy to the ultracapacitor when the field current is less than or equal to a threshold value.

11. The non-transitory computer readable medium of claim 10, wherein the computer program instructions further comprise computer program instructions defining the steps of:
  receiving a command; and
  in response to the command, transferring the electromagnetic energy to the ultracapacitor.

12. The non-transitory computer readable medium of claim 10, wherein the computer program instructions further comprise computer program instructions defining the step of:
  partially charging the ultracapacitor prior to transferring the electromagnetic energy to the ultracapacitor.

13. The non-transitory computer readable medium of claim 10, wherein the computer program instructions further comprise computer program instructions defining the step of:
  discharging electrical energy from the ultracapacitor after the electromagnetic energy has been stored in the ultracapacitor.

14. A field discharge system for transferring electromagnetic energy from a field winding of a synchronous motor, wherein the field winding is energized by a direct current source comprising a direct current link capacitor, the field discharge system comprising:
  an ultracapacitor;
  a first switch operatively coupled to the ultracapacitor;
  a second switch operatively coupled to the ultracapacitor;
  a control element configured to transmit a fault signal in response to a short circuit of the direct current link capacitor; and
  a field discharge system controller operatively coupled to the first switch, the second switch, and the control element;
  wherein:
    the field discharge system controller is configured to:
      transmit a first control signal; and
      in response to receiving a fault signal from the control element, transmit a second control signal; and the first switch and the second switch are configured to:
      in response to receiving the first control signal from the field discharge system controller, transmit current from the direct current source through the field winding; and
      in response to receiving the second control signal from the field discharge system controller, transfer electromagnetic energy from the field winding to the ultracapacitor and store the electromagnetic energy in the ultracapacitor.

15. The field discharge system of claim 14, wherein the field discharge system controller is further configured to:
  receive a command; and in response to the command, transmit the second control signal.

16. The field discharge system of claim 14, wherein the control element is a first control element, further comprising a second control element configured to:
  receive at least one control signal from the field discharge system controller.

* * * * *